United States Patent
Chun et al.

(10) Patent No.: US 9,220,030 B2
(45) Date of Patent: Dec. 22, 2015

(54) METHOD OF ALLEVIATING INTERFERENCE BETWEEN CELLS IN A MULTICELL SYSTEM AND DEVICE FOR THE METHOD

(75) Inventors: Jinyoung Chun, Anyang-si (KR); Binchul Ihm, Anyang-si (KR); Jiwon Kang, Anyang-si (KR); Sunam Kim, Anyang-si (KR); Sungho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 13/822,228

(22) PCT Filed: Sep. 16, 2011

(86) PCT No.: PCT/KR2011/006832
§ 371 (c)(1),
(2), (4) Date: Mar. 11, 2013

(87) PCT Pub. No.: WO2012/036492
PCT Pub. Date: Mar. 22, 2012

(65) Prior Publication Data
US 2013/0172003 A1    Jul. 4, 2013

Related U.S. Application Data

(60) Provisional application No. 61/383,721, filed on Sep. 16, 2010.

(51) Int. Cl.
*H04W 24/10* (2009.01)
*H04J 11/00* (2006.01)

(52) U.S. Cl.
CPC ............ *H04W 24/10* (2013.01); *H04J 11/005* (2013.01); *H04J 2211/001* (2013.01)

(58) Field of Classification Search
CPC . H04J 11/005; H04J 2211/001; H04W 24/10; H04W 28/0236; H04W 28/0247; H04W 28/04; H04W 52/0238; H04W 52/04; H04W 52/14; H04W 52/16; H04W 28/16; H04W 52/244; H04W 52/386; H04W 52/40; H04W 52/50; H04W 48/02; H04W 48/16; H04W 48/17; H04W 48/18; H04W 48/20; H04B 1/0475; H04B 1/0483; H04B 1/1027; H04B 2001/1045; H04B 1/71; H04B 1/711; H04B 2001/7154; H04B 2201/709718; H04B 2201/709745
USPC ............ 455/41.2, 62, 63.1, 67.11, 67.16, 69, 455/103, 114.2, 115.1, 115.3, 126, 226, 455/226.1–226.3, 278.1, 283–285, 296, 455/422.1, 423–425, 434, 443–450, 452.1, 455/453, 456.3, 513, 517, 524–526, 550.1, 455/553.1, 560–561, 702; 375/140–150, 375/346–349, 358; 310/310, 328, 332, 334, 310/338, 500, 504
See application file for complete search history.

(56) References Cited

U.S. PATENT DOCUMENTS 6,091,955 A * 7/2000 Aalto et al. .................... 455/447
8,492,696 B2 * 7/2013 Akerman et al. ........... 250/208.1
(Continued)

FOREIGN PATENT DOCUMENTS

CN            1667990 A1 * 9/2005
KR     10-2007-0095228      9/2007
(Continued)

*Primary Examiner* — Meless Zewdu
(74) *Attorney, Agent, or Firm* — Dentons US LLP

(57) ABSTRACT

The present invention discloses a method of a terminal to reduce interference between cells in a multicell system. In more detail, the method includes: receiving information on at least one adjacent base station from a serving base station; receiving a reference signal from the at least one adjacent base station on the basis of the information on the at least one adjacent base station; measuring interference for each transmitting antenna of the at least one adjacent base station by using the reference signal; and transmitting interference information on the each transmitting antenna to the serving base station.

12 Claims, 4 Drawing Sheets

(56) References Cited

U.S. PATENT DOCUMENTS

| | | | |
|---|---|---|---|
| 2007/0049199 A1* | 3/2007 | Lim et al. | 455/63.1 |
| 2007/0082619 A1* | 4/2007 | Zhang et al. | 455/69 |
| 2008/0019350 A1* | 1/2008 | Onggosanusi et al. | 370/350 |
| 2009/0047971 A1* | 2/2009 | Fu | 455/450 |
| 2009/0181708 A1* | 7/2009 | Kim et al. | 455/501 |
| 2009/0270109 A1* | 10/2009 | Wang Helmersson et al. | 455/453 |
| 2010/0003986 A1* | 1/2010 | Chen | 455/436 |
| 2010/0099450 A1* | 4/2010 | Lu et al. | 455/501 |
| 2010/0144381 A1* | 6/2010 | Park et al. | 455/501 |
| 2010/0159972 A1* | 6/2010 | Cho et al. | 455/501 |
| 2010/0177721 A1* | 7/2010 | Simonsson et al. | 370/329 |
| 2010/0255852 A1* | 10/2010 | Chen et al. | 455/450 |
| 2010/0267387 A1* | 10/2010 | Stephens | 455/436 |
| 2010/0322227 A1* | 12/2010 | Luo | 370/345 |
| 2011/0086663 A1* | 4/2011 | Gorokhov et al. | 455/522 |

FOREIGN PATENT DOCUMENTS

| | | |
|---|---|---|
| KR | 10-2010-0000343 | 1/2010 |
| KR | 10-2010-0046755 | 5/2010 |
| WO | 2008084938 | 7/2008 |
| WO | 2009065075 | 5/2009 |
| WO | 2009099811 | 8/2009 |
| WO | 2010062238 | 6/2010 |

\* cited by examiner

METHOD OF ALLEVIATING INTERFERENCE BETWEEN CELLS IN A MULTICELL SYSTEM AND DEVICE FOR THE METHOD

This Application is a 35 U.S.C. §371 National Stage Entry of International Application No. PCT/KR2011/006832, filed Sep. 16, 2011 and claims the benefit of U.S. Provisional Application No. 61/383,721, filed Sep. 16, 2010, which is incorporated by reference in its entirety herein.

TECHNICAL FIELD

The present invention relates to a wireless communication system, and more particularly, to a method of mitigating an inter-cell interference in a multi cell system and apparatus therefor.

BACKGROUND ART

Next generation communication system selects a multi-node or a multi-cell cooperative method to obtain maximum efficiency with a limited resource. The method has a superior performance than a case that each node does not cooperate with each other by working as an independent base station (BS, Node-B, eNode-B, AP etc.).

FIG. 1 is a diagram for showing an example of a multi-node system in a next generation system.

Referring to FIG. 1, one base station controller manages the transmission/reception of all nodes and each node is working as a part of antenna group of one base station. Hence, the above mentioned system can be seen as a distributed antenna system (DAS), which forms a huge cell.

Unlike FIG. 1, if each of the nodes has an individual base station controller or a cell ID (identifier) and the individual base station controller controls a scheduling and a handover for each of the nodes, this may be called a multi-cell system. If the multi-cell system is configured in a manner of being duplicated according to a coverage, the above mentioned is called a multi-tier network.

FIG. 2 is a diagram for showing an example of a multi-cell system configured with a multi-tier network in a next generation communication system.

Referring to FIG. 2, in case that a CSG (closed subscriber group) terminal only supportive of CSG node, for instance, a CSG pico eNB or a CSG femto eNB, is operated in a multi-tier network, the corresponding CSG node may give a very strong interference to a terminal, which is not a CSG terminal existed in the corresponding coverage, i.e., an OSG (open subscriber group) terminal.

The present invention proposes an effective method of eliminating interference from a terminal receiving the interference from a plurality of nodes or a plurality of base stations in the aforementioned multi-node or the multi-cell system.

DISCLOSURE OF THE INVENTION

Technical Task

A technical task of the present invention is to provide a method of mitigating an inter-cell interference in a multi-cell system and an apparatus therefor.

Technical tasks obtainable from the present invention may be non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment of the present invention a method of reducing an inter-cell interference, which is reduced by a terminal in a multi-cell system includes the steps of receiving an information on at least one adjacent base station from a serving base station, receiving a reference signal from the at least one adjacent base station based on the information on at least one adjacent base station, receiving a reference signal from the at least one adjacent base station based on the information on at least one adjacent base station, and transmitting an interference information for each of the transmitting antennas to the serving base station. In this case, the information on the at least one adjacent base station includes an information on a cell identifier of each of the at least one adjacent base station and the number of transmitting antenna.

Preferably, the adjacent base station stops transmitting to at least one transmitting antenna for a specific radio resource based on the interference information for each of the transmitting antennas. And, the adjacent base station assigns a transmit power reserved for the antenna stopped transmitting to a transmitting antenna not stopped transmitting.

Preferably, the interference information transmitting step includes the step of if interference for transmitting antennas of the at least one adjacent base station is greater than a pre-set threshold value, transmitting the interference information on the transmitting antenna having the interference greater than the threshold value to the serving base station.

Moreover, the method further includes the step of transmitting a measured interference information on each of the transmitting antennas to an adjacent base station corresponding to the interference information among the at least one adjacent base station.

Meanwhile, to further achieve these and other advantages and in accordance with the purpose of the present invention, according to another embodiment of the present invention a terminal device in a multi-cell system includes a receiving module configured to receive an information on at least one adjacent base station from a serving base station and configured to receive a reference signal from the at least one adjacent base station based on the information on the at least one adjacent base station, a processor configured to measure an interference for each of transmitting antennas of the at least one adjacent base station using the reference signal, and a transmitting module configured to transmit an interference information for each of the transmitting antennas to the serving base station. In this case, the information on the at least one adjacent base station includes an information on a cell identifier of each of the at least one adjacent base station and the number of transmitting antenna.

And, the adjacent base station stops transmitting to at least one transmitting antenna for a specific radio resource based on the interference information for each of the transmitting antennas and the adjacent base station assigns a transmit power reserved for the antenna stopped transmitting to a transmitting antenna not stopped transmitting.

Preferably, the at least one adjacent base station includes a CSG (closed subscriber group) base station.

More preferably, if interference for transmitting antennas of the at least one adjacent base station is greater than a pre-set threshold value, the processor is configured to control the transmitting module to transmit the interference information on the transmitting antenna having the interference greater than the threshold value to the serving base station.

Moreover, the transmitting module is configured to transmit a measured interference information on each of the transmitting antennas to an adjacent base station corresponding to the interference information among the at least one adjacent base station. In this case, the interference information transmitted to the adjacent base station is transmitted using a pre-assigned resource.

Advantageous Effects

Accordingly, an embodiment of the present invention may be able to effectively reduce an inter-cell interference in a multi-cell system.

Effects obtainable from the present invention may be non-limited the above mentioned effect. And, other unmentioned effects and/or advantages can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

Besides, in the following description, a terminal or a device may be stationary or may have mobility. And, the terminal may be a common name of a user end device such as a UE (user equipment), an MS (mobile station) and the like. And, a base station may be a common name of such a random node of a network end as a Node B, eNode B, base station and the like for communicating with a terminal or a device.

Figure 1:
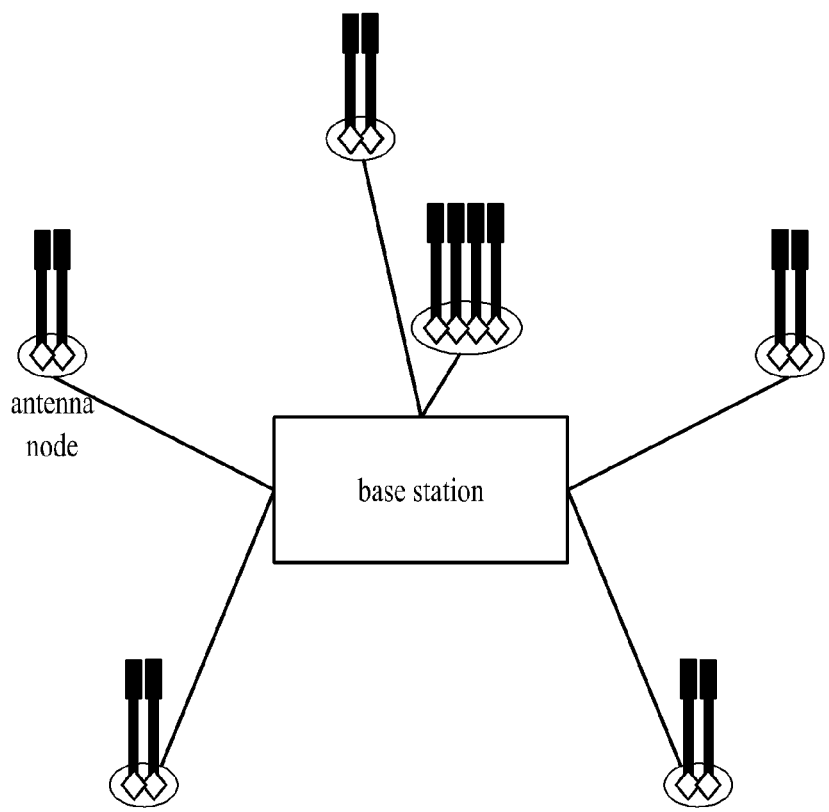
FIG. 1 is a diagram for showing an example of a multi-node system in a next generation system.
Figure 2:
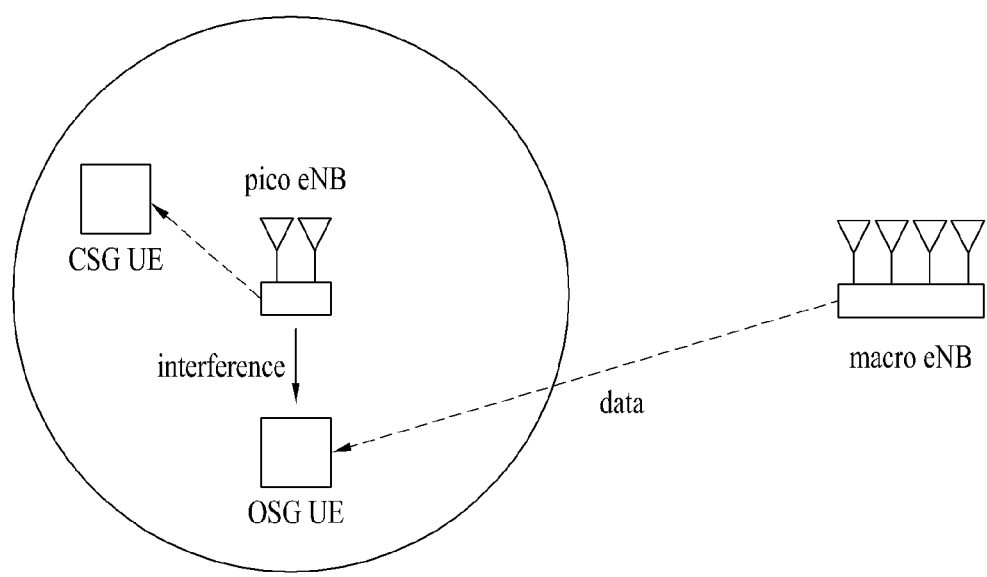
FIG. 2 is a diagram for showing an example of a multi-cell system configured with a multi-tier network in a next generation communication system.
Figure 3:
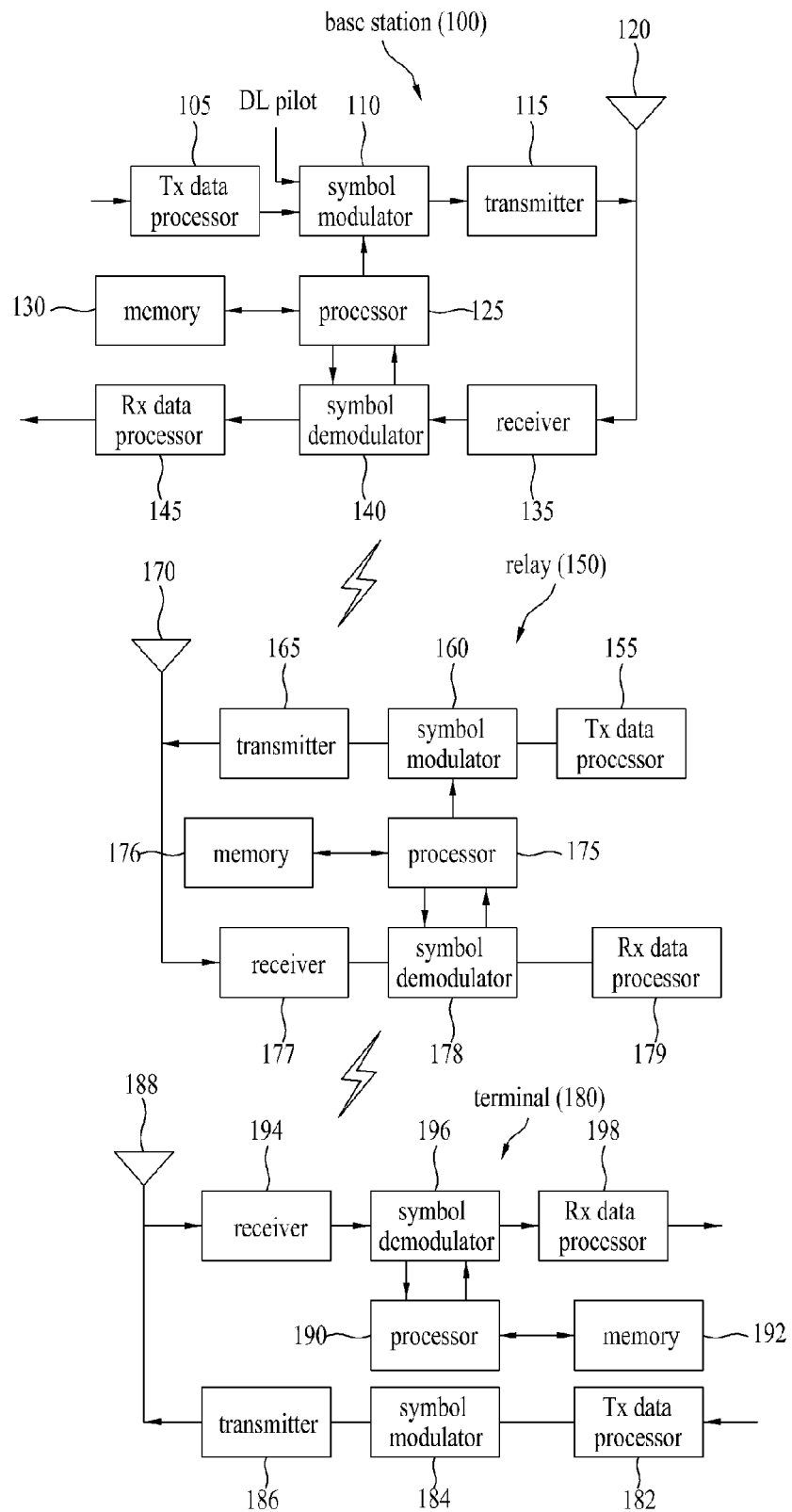
FIG. 3 is a block diagram for a configuration of a communication system according to the present invention.

FIG. 3 is a block diagram for a configuration of a communication system according to the present invention.

A communication system according to the present invention may be able to include a base station 100, a relay 150, a terminal 180, and a network (not depicted). Although one base station 100, one relay 200, and one terminal 300 are depicted in order to show a communication system in a manner of simplifying, a wireless communication system according to the present invention may include a plurality of base stations, relays, and terminals.

Referring to FIG. 3, a base station 100 may be able to include a transmitting (Tx) data processor 105, a symbol modulator 110, a transmitter 115, a transmitting/receiving antenna 120, a processor 125, a memory 130, a receiver 135, a symbol demodulator 140, a receiving (Rx) data processor 145. And, a relay 150 may also be able to include a transmitting (Tx) data processor 155, a symbol modulator 160, a transmitter 165, a transmitting/receiving antenna 170, a processor 175, a memory 176, a receiver 177, a symbol demodulator 178, a receiving (Rx) data processor 179. And a terminal 180 may be able to include a transmitting (Tx) data processor 182, a symbol modulator 184, a transmitter 186, a transmitting/receiving antenna 188, a processor 190, a memory 192, a receiver 194, a symbol demodulator 196, a receiving (Rx) data processor 198.

The antennas 120/170/188 are depicted as one in the base station 100, the relay 150, and the terminal 180, respectively. Yet, pluralities of antennas are installed in the base station 100, the relay 150, and the terminal 180. Hence, the base station 100, the relay 150, and the terminal 180 according to the present invention supports a MIMO (multiple input multiple output) system. The base station 100, the relay 150, and the terminal 180 according to the present invention may be able to support both of a SU-MIMO (single user MIMO) and an MU-MIMO (multi user MIMO) method.

In downlink, the transmitting data processor 105 of the base station 100 receives traffic data, performs coding on the received traffic data by formatting, interleaves the coded traffic data, modulates (or symbol maps) the interleaved data, and then provides modulated symbols (data symbols). The symbol modulator 110 provides a stream of symbols by receiving and processing the data symbols and pilot symbols.

The symbol modulator 110 of the base station 100 multiplexes the data and pilot symbols together and then transmits the multiplexed symbols to the transmitter 115. In doing so, each of the transmitted symbols may include the data symbol, the pilot symbol or a signal value of zero. Pilot symbols may be contiguously transmitted in each of symbol durations. The pilot symbols may include symbols of frequency division multiplexing (FDM), orthogonal frequency division multiplexing (OFDM), time division multiplexing (TDM), or code division multiplexing (CDM).

The transmitter 115 of the base station 100 receives the stream of the symbols, converts the received stream to at least one or more analog signals, additionally adjusts the analog signals (e.g., amplification, filtering, frequency upconverting, etc.), and then generates a downlink signal suitable for transmitting on a radio channel. Subsequently, the downlink signal is transmitted to the terminal via the transmitting antenna 120.

The receiving antenna 170 of the relay 150 may be able to receive a downlink signal from the base station 100. The processor 175 of the relay 150 modulates and processes the downlink signal received from the base station 100 and may be then able to transmit it to the terminal 110 via the transmitting antenna 170. And, the receiving antenna 170 of the relay 150 may be able to receive an uplink signal from the terminal 110. The processor 175 of the relay 150 demodulates and processes the uplink signal received from the terminal 110 and may be then able to transmit it to the base station 100.

The antenna 188 of the terminal 180 receives the downlink signal from the base station 100 or the relay 150 and then provides the received signal to the receiver 194. The receiver 194 adjusts the received signal (e.g., filtering, amplification and frequency downconverting), digitizes the adjusted signal, and then obtains samples. The symbol demodulator 198 demodulates the received pilot symbols and then provides them to the processor 190 for channel estimation.

The symbol demodulator 196 receives a frequency response estimated value for downlink from the processor 190, obtains data symbol estimated values (i.e., estimated values of the transmitted data symbols) by performing data modulation on the received data symbols, and then provides the data symbol estimated values to the receiving (Rx) data processor 198. The received data processor 198 reconstructs the transmitted traffic data by performing demodulation (i.e., symbol demapping, deinterleaving and decoding) on the data symbol estimated values.

The processing by the symbol demodulator 196 and the receiving data processor 198 are complementary to the processing by the symbol modulator 110 and the transmitting data processor 105 in the base station 105, respectively.

Regarding the terminal 180 in uplink, the transmitting data processor 182 provides data symbols by processing the traffic data. The symbol modulator 184 provides a stream of symbols to the transmitter 186 by receiving the data symbols, multiplexing the received data symbols, and then performing modulation on the multiplexed symbols. The transmitter 186 generates an uplink signal by receiving the stream of the symbols and then, processing the received stream. The generated uplink signal is then transmitted to the base station 100 or the relay 150 via the transmitting antenna 188.

In the base station 100, the uplink signal is received from the terminal 180 via the receiving antenna 120. The receiver 135 obtains samples by processing the received uplink signal. Subsequently, the symbol demodulator 140 provides pilot symbols received in uplink and a data symbol estimate value by processing the obtained samples. The receiving data processor 145 reconstructs the traffic data transmitted from the terminal 180 by processing the data symbol estimate value.

The processor 125/175/190 of the base station 100/relay 150/terminal 180 directs operations (e.g., control, adjustment, management, etc.) of the base station 100/relay 150/terminal 180. The processors 125/175/190 may be connected to the memory 130/176/192 configured to store program codes and data. The memory 130/176/192 is connected to the processor 125/175/190 and then stores operating systems, applications and general files.

The processor 125/175/190 may be called one of a controller, a microcontroller, a microprocessor, a microcomputer and the like. And, the processor 125/175/190 may be implemented using hardware, firmware, software and/or any combinations thereof. In the implementation by hardware, the processor 125/175/190 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 125/175/190 or saved in the memory 130/176/192 to be driven by the processor 125/175/190.

Layers of a radio interface protocol between a base station 100, a relay 150, and a terminal 180 may be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between the terminal 180 and network. The base station 100, the relay 150, and the terminal 180 exchange RRC messages with each other via a radio communication network and the RRC layer.

Figure 4:
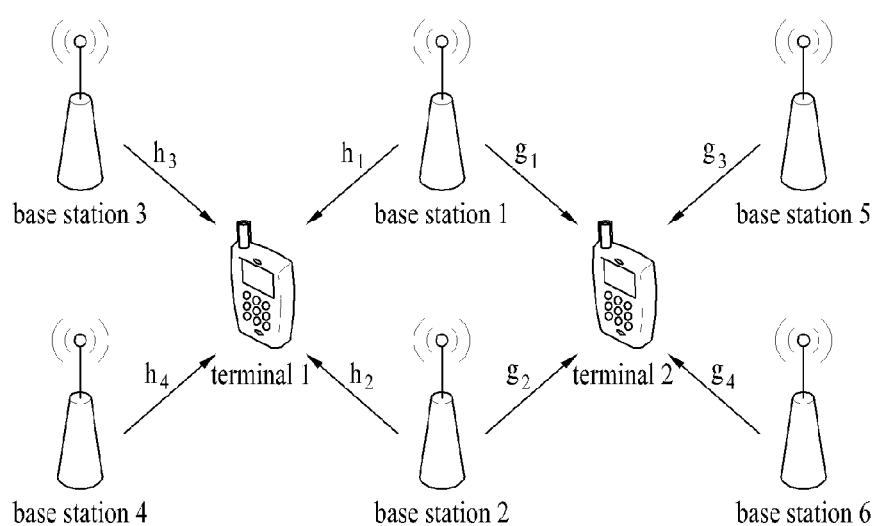
FIG. 4 is a diagram for explaining a method of mitigating an inter-cell interference according to embodiment of the present invention.

FIG. 4 is a diagram for explaining a method of mitigating an inter-cell interference according to embodiment of the present invention.

Referring to FIG. 4, assume that a terminal 1 receives a signal from base stations (or antennas) 1, 2, 3, and 4 and a terminal 2 receives a signal from base stations (or antennas) 1, 2, 5, and 6. In doing so, the terminal 1 can be interfered with the signal of base station 1 and 2, which transmits signals to the terminal 2. In this case, assume that the terminal 3 and 4 are away enough not to interfere with the terminal 2 and the base station 5 and 6 are also away enough not to interfere with the terminal 1.

In order to solve the interference problem of the terminal 1, which receives interference from the signals of the base station 1 and 2, various methods are under discussion in 3GPP LTE-A (long term evolution-advanced) standard or 3GPP2 IEEE (institute of electrical and electronics engineers) 802.16m standard.

The methods currently considered are to avoid an inter-cell interference by mainly utilizing FDM (frequency division multiplexing), TDM (time division multiplexing), or downlink transmit power control. These methods are also utilized to reduce the interference between multi-cells having an identical coverage. Yet, in case of the aforementioned methods, since a resource capable of being used by a cell is, in turn, given to a different cell in a manner of being divided, there may exist a drawback of degradation of system efficiency, limitation of scheduling, and the like.

In order to solve the above-mentioned inter-cell interference problem, the present invention proposes a method of turning off a part of the antenna of interfering base station, i.e., the base station 1 and 2, which transmit signals to the terminal 2 in a time or frequency band of severe interference. The expression of turning an antenna off in the present invention means that the antenna does not transmits a signal.

For clarity in the following description, in case that a terminal(s) receiving a service from a base station A is difficult to communicate due to an interfering signal of a base station B, it shall be explained in a manner of limiting to a case that the base station B turns off the antenna(s) of most severe interference.

In particular, in case that this method is applied to a specific time(s) and/or a frequency band only, compared with the case of applying a conventional TDM/FDM method only, capacity loss of the base station B can be minimized since the service of the base station B is not cut off. And, this method can be applied effectively in case that the base station A is a macro base station, the base station B is a CSG femto base station located within the coverage of the macro base station or near the coverage of the macro station, and the terminal does not belong to the base station B. Details are described in the following.

If a terminal judges that interference is severe, for instance, if the CINR (carrier to interface ratio) of a serving base station does not satisfy a pre-defined threshold or if the RSSI (received signal strength indication) is greater than the pre-defined threshold, the terminal reports this interference situation to the serving base station.

If a terminal is aware of a cell ID of an adjacent base station(s) and the number of transmitting antenna, it may be able to know interference degree per antenna of the adjacent base station(s) in a manner of measuring a reference signal (a CRS, a CSI-RS, or a midamble) of each of the base stations. The terminal feedbacks the cell ID of interfering adjacent base station(s) and interfering antenna index (or an index of the reference signal) based on the measured result. In this case, feedback information may also include RSSI, RSRP (reference signal received power) and the like, which are measured values for the interference degree. In case that the terminal is not aware of the number of antenna of the adjacent base station(s) or information on the reference signal, it is preferable to perform a measurement after receiving a response for a corresponding information in a manner of requesting the corresponding information to the serving base station.

The target for performing a feedback the interference information, which is performed by a terminal(s), may be either a base station A or a base station B. In case that the terminal feedbacks the information to the base station A, which is a serving base station, the base station A communicates with the base station B and then makes the base station B reduce interference. In case that the terminal feedbacks the information to the base station B, i.e., in case that the terminal directly reports the feedback information on the interference to the interfering base station, it may be able to make the base station B reduce the interference by itself.

In particular, in case that the terminal directly reports the feedback information to the base station B, a frequency resource for interference reporting should be assigned in advance. Or, in case of using such a contention-based channel as a ranging channel and the like, it may be able to consider using a specific code as a request for the interference reporting.

The base station A or B may be able to turn off the antenna(s) of the base station B based on the feedback report of the terminal or with reference to the feedback report. In particular, the base station A may be able to request the base station B to turn off the antenna(s) of the base station B or the base station B may be able to turn off the antenna(s) of its own by itself. In this case, the interfering antenna(s) may be turned off all the time or turned off in a specific time domain(s) and/or a specific frequency domain(s).

At least one of the informations on such an antenna turning off as an index of antenna to be turned off, the number of transmitting antenna, which is not turned off, a radio resource region to which the antenna turning off is applied should be signaled to the base station A, B, and the terminal(s). The base stations may recognize this information by themselves or may be able to receive from a counterpart base station. The terminal(s) may be able to signal the informations to the base station A or B as broadcast information in a manner of multicast or unicast.

For instance, in case of following the aforementioned 3GPP2 IEEE 802.16m standard, a femto base station transmits AAI_SON-ADV message to the terminals receiving a service from the femto base station to inform the state information of the femto base station. The message includes information on a transmit power reduction to mitigate interference, not available subframe, and the like. The present invention proposes to include the aforementioned antenna turning off information in the AAI_SON-ADV message.

And, in case of a terminal(s) receiving a service on a specific time and/or a frequency domain making an antenna off, the terminal(s) is able to signal with the MIMO to which an antenna grouping or an antenna selection technique applied thereto according to Allocation A-MAP IE of 3GPP IEEE 802.16m. In this case, since the terminal does not need to recognize that the signal is aimed for interference mitigation and receives data with a signaled method only, it can be seen as an implied signaling.

As a different characteristic of the present invention, in case that a specific antenna(s) is turned off like as mentioned in the present invention, it may be able to assign a transmit power, which was supposed to be assigned to the specific antenna(s), to a different antenna(s). In doing so, since the total of transmit power of the base station B is maintained, the capacity loss can be minimized. In particular, a signaling, which informs that the transmit power of the rest of antennas is increased, can be included in the AAI_SON-ADV message together with the antenna off information.

As mentioned in the foregoing description, the detailed descriptions for the preferred embodiments of the present invention are provided in a manner of being implemented by those skilled in the art to which the present invention pertains. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

INDUSTRIAL APPLICABILITY

It will be apparent to those skilled in the art that various modifications and variations can be made therein without departing from the spirit and scope of the invention. Thus, it is intended that the detailed explanation should not be interpreted limitedly but considered as exemplary in all aspect. The scope of the present invention should be determined by a reasonable interpretation of the attached claims. All changes within the equivalent scope of the present invention are included in the scope of the present invention.

What is claimed is:

1. A method of reducing an inter-cell interference, which is reduced by a terminal in a multi-cell system, the method comprising:
   receiving information on at least one adjacent base station from a serving base station;
   receiving a reference signal from the at least one adjacent base station based on the information on the at least one adjacent base station;
   measuring an interference for each of transmitting antennas of the at least one adjacent base station using the reference signal; and
   transmitting interference information for each of the transmitting antennas to the serving base station,
   wherein the adjacent base station stops transmitting on at least one transmitting antenna on a specific radio resource based on the interference information for each of the transmitting antennas, and wherein the adjacent base station assigns a transmit power, reserved for the antenna not transmitting, to an antenna that is transmitting.

2. The method of claim 1, wherein the information on the at least one adjacent base station comprises information on a cell identifier of each of the at least one adjacent base station and a number of transmitting antenna.

3. The method of claim 1, wherein the at least one adjacent base station comprises a CSG (closed subscriber group) base station.

4. The method of claim 1, wherein transmitting the interference information comprising, if interference for transmitting antennas of the at least one adjacent base station is greater than a threshold value, transmitting the interference information on the transmitting antenna having the interference greater than the threshold value to the serving base station.

5. The method of claim 1, further comprising transmitting the interference on each of the transmitting antennas to an adjacent base station corresponding to the interference information among the at least one adjacent base station.

6. The method of claim 5, wherein the interference information transmitted to the adjacent base station is transmitted using a pre-assigned resource.

7. A terminal device in a multi-cell system, the terminal device comprising:
  a receiving module configured to receive information on at least one adjacent base station from a serving base station and configured to receive a reference signal from the at least one adjacent base station based on the information on the at least one adjacent base station;
  a processor configured to measure an interference for each of transmitting antennas of the at least one adjacent base station using the reference signal; and
  a transmitting module configured to transmit interference information for each of the transmitting antennas to the serving base station, wherein the adjacent base station stops transmitting on at least one transmitting antenna on a specific radio resource based on the interference information for each of the transmitting antennas, and wherein the adjacent base station assigns a transmit power, reserved for the antenna not transmitting, to an antenna that is transmitting.

8. The terminal device of claim 7, wherein the information on the at least one adjacent base station comprises information on a cell identifier of each of the at least one adjacent base station and a number of transmitting antenna.

9. The terminal device of claim 7, wherein the at least one adjacent base station comprises a CSG (closed subscriber group) base station.

10. The terminal device of claim 7, wherein if interference for transmitting antennas of the at least one adjacent base station is greater than a threshold value, the processor is configured to control the transmitting module to transmit the interference information on the transmitting antenna having the interference greater than the threshold value to the serving base station.

11. The terminal device of claim 7, wherein the transmitting module is configured to transmit the interference on each of the transmitting antennas to an adjacent base station corresponding to the interference information among the at least one adjacent base station.

12. The terminal device of claim 11, wherein the interference information transmitted to the adjacent base station is transmitted using a pre-assigned resource.

* * * * *